June 17, 1958 A. ELLETT 2,839,598

SUBSCRIPTION TELEVISION SYSTEM

Filed Oct. 6, 1951 3 Sheets-Sheet 1

INVENTOR.
ALEXANDER ELLETT
BY Francis W. Crotty
ATTORNEY

June 17, 1958 A. ELLETT 2,839,598

SUBSCRIPTION TELEVISION SYSTEM

Filed Oct. 6, 1951 3 Sheets-Sheet 2

INVENTOR.
ALEXANDER ELLETT
BY Francis W. Crotty
ATTORNEY

June 17, 1958

A. ELLETT 2,839,598

SUBSCRIPTION TELEVISION SYSTEM

Filed Oct. 6, 1951

3 Sheets-Sheet 3

INVENTOR.
ALEXANDER ELLETT
BY Francis W. Crotty
ATTORNEY

United States Patent Office 2,839,598

Patented June 17, 1958

2,839,598

SUBSCRIPTION TELEVISION SYSTEM

Alexander Ellett, River Forest, Ill., assignor to Zenith Radio Corporation, a corporation of Illinois Application October 6, 1951, Serial No. 250,096

1 Claim. (Cl. 178—5.1)

Figure 1:
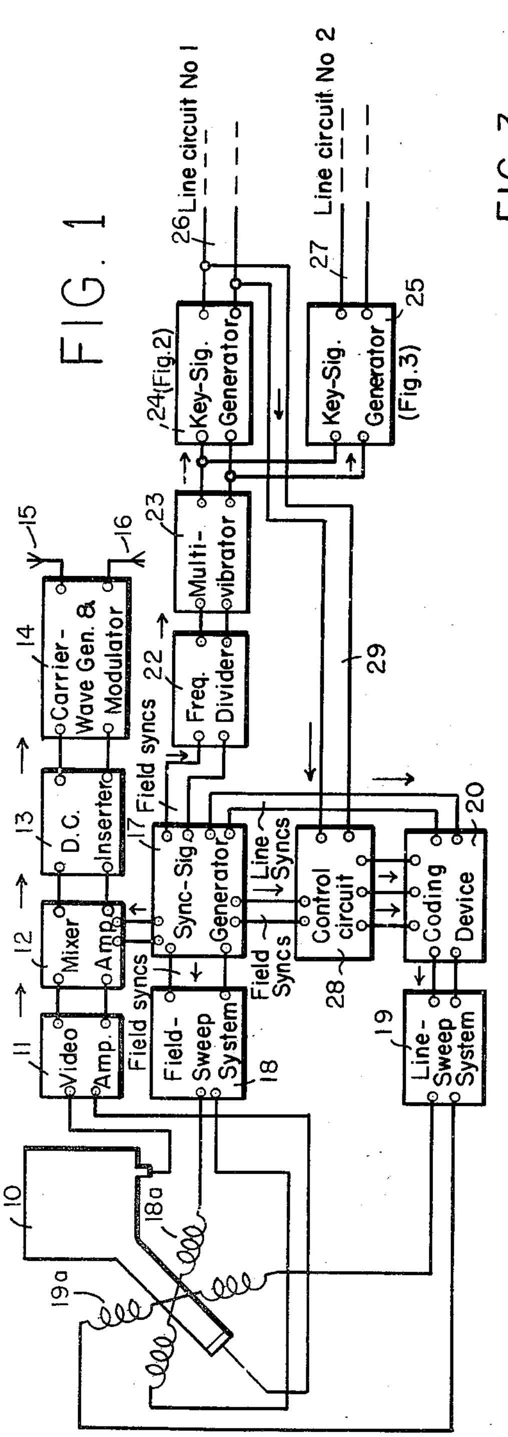

This invention relates to subscription systems in which a signal coded in accordance with a coding schedule is transmitted over a first signal channel, and key signal information indicating the coding schedule is disseminated to subscriber receivers over a line circuit such as a telephone line.

Patent 2,510,046, issued May 30, 1950, in the name of Alexander Ellett et al., entitled "Radio Wire Signalling System," and Patent 2,547,598, issued April 3, 1951, in the name of E. M. Roschke, entitled "Subscription Image Transmission System and Apparatus," both assigned to the present assignee, disclose and claim subscription television systems of the aforementioned type. In the Roschke system, for example, the radiated television signal is coded by varying the time relation between its video and line-synchronizing components during spaced operating intervals, and bursts of key signal are preferably transmitted to subscriber receivers over a line circuit to indicate the times of occurrence of such intervals. It is proposed that the existing telephone networks be used as a line circuit for the distribution of the key signal to subscriber receivers. However, the transmission of the key signal over telephone networks may lead to a situation wherein a single telephone cable may contain circuits carrying the key signal to subscriber receivers and other circuits connected to non-subscriber telephones which do not carry the key signal. It is possible in such a case that the key signal may be induced from the former into the latter circuits, and permit unauthorized persons to obtain the key signal and utilize it for decoding purposes.

It is an object of the invention to provide a subscription transmitter which transmits a signal over a first channel coded in accordance with a coding schedule, and which produces key-signal information indicating the coding schedule for transmission to subscriber receivers over a line circuit and having such characteristics as to preclude the reception of this information by unauthorized persons.

A more specific object of the invention is to provide a subscription transmitter which transmits a signal over a first channel coded in accordance with a coding schedule, and which produces key-signal information indicating the coding schedule for transmission to subscriber receivers over a plurality of line circuits and having such characteristics as to preclude the information from being induced into other circuits adjacent the aforementioned line circuits.

In accordance with the invention, a transmitter for a subscription-type television signalling system comprises apparatus for producing a television signal and a coding device coupled to the signal-producing apparatus for establishing the transmitter in a first operating mode during spaced operating intervals and in a second operating mode during intervening intervals in accordance with a coding schedule, thus effectively coding the television signal. The transmitter includes key-signal generating apparatus for developing a first key signal having a predetermined characteristic during the spaced first-mode operating intervals and a different predetermined characteristic during intervening second-mode intervals. Concurrently, the key-signal generating apparatus develops a second key signal which has the aforementioned predetermined characteristic during the intervening second-mode intervals and the different predetermined characteristic during the spaced first-mode operating intervals. Each of the key signals is thus indicative of the coding schedule. The transmitter further comprises a plurality of separate but adjacent wire line circuits, and a pair of these wire line circuits are employed for respectively distributing the key signals to subscriber receivers while precluding inductive coupling of the key signals into any of the other wire line circuits.

Figures 2, 3:
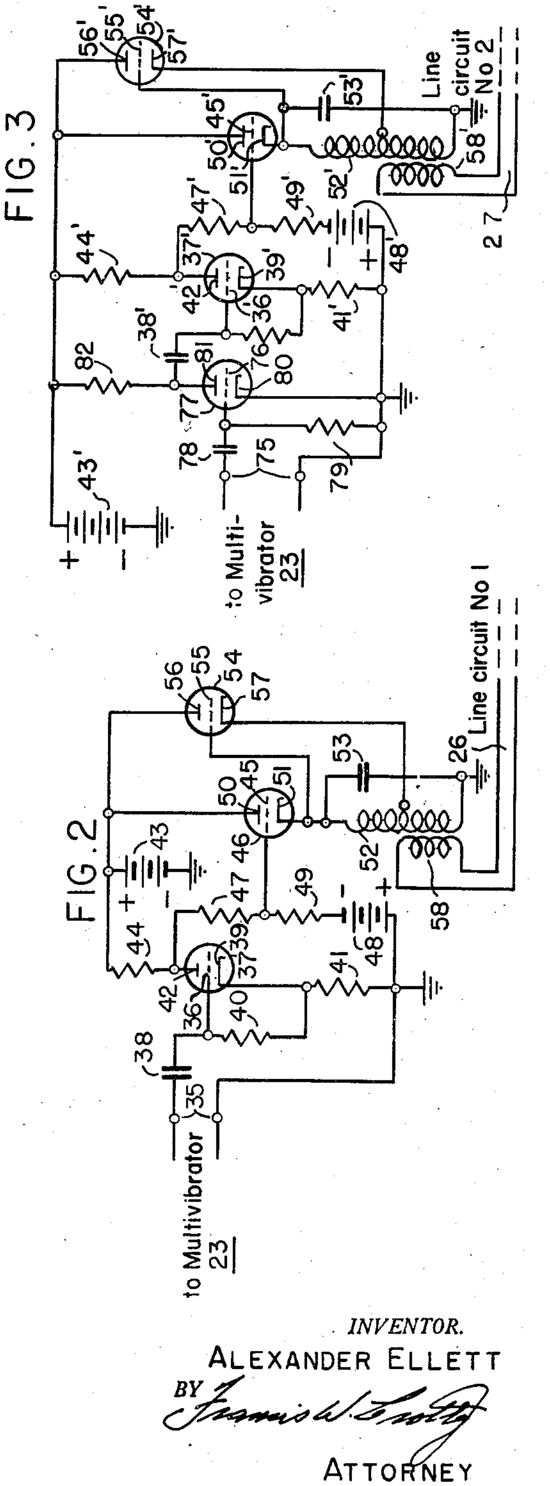
Figure 4:
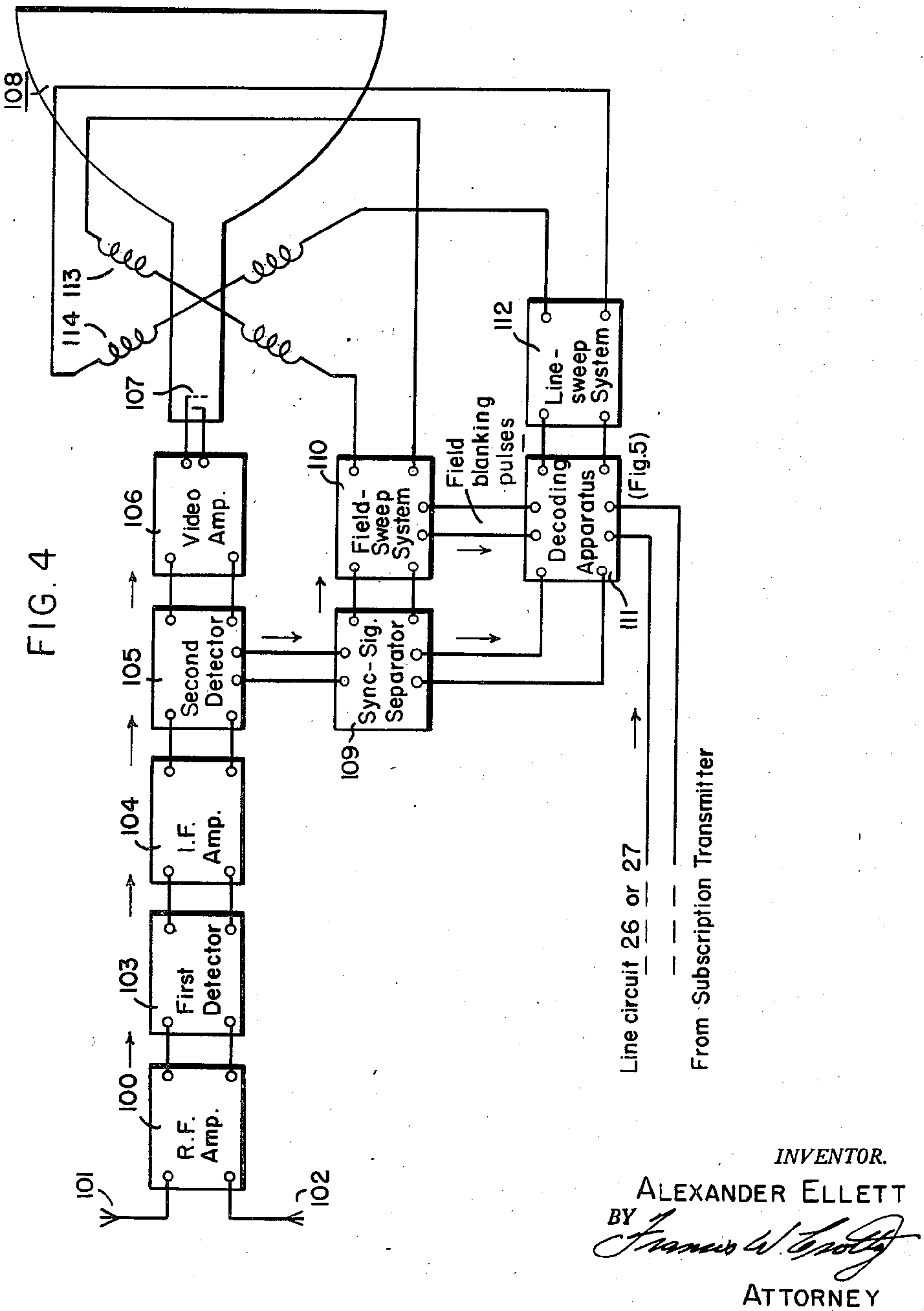
Figure 5:
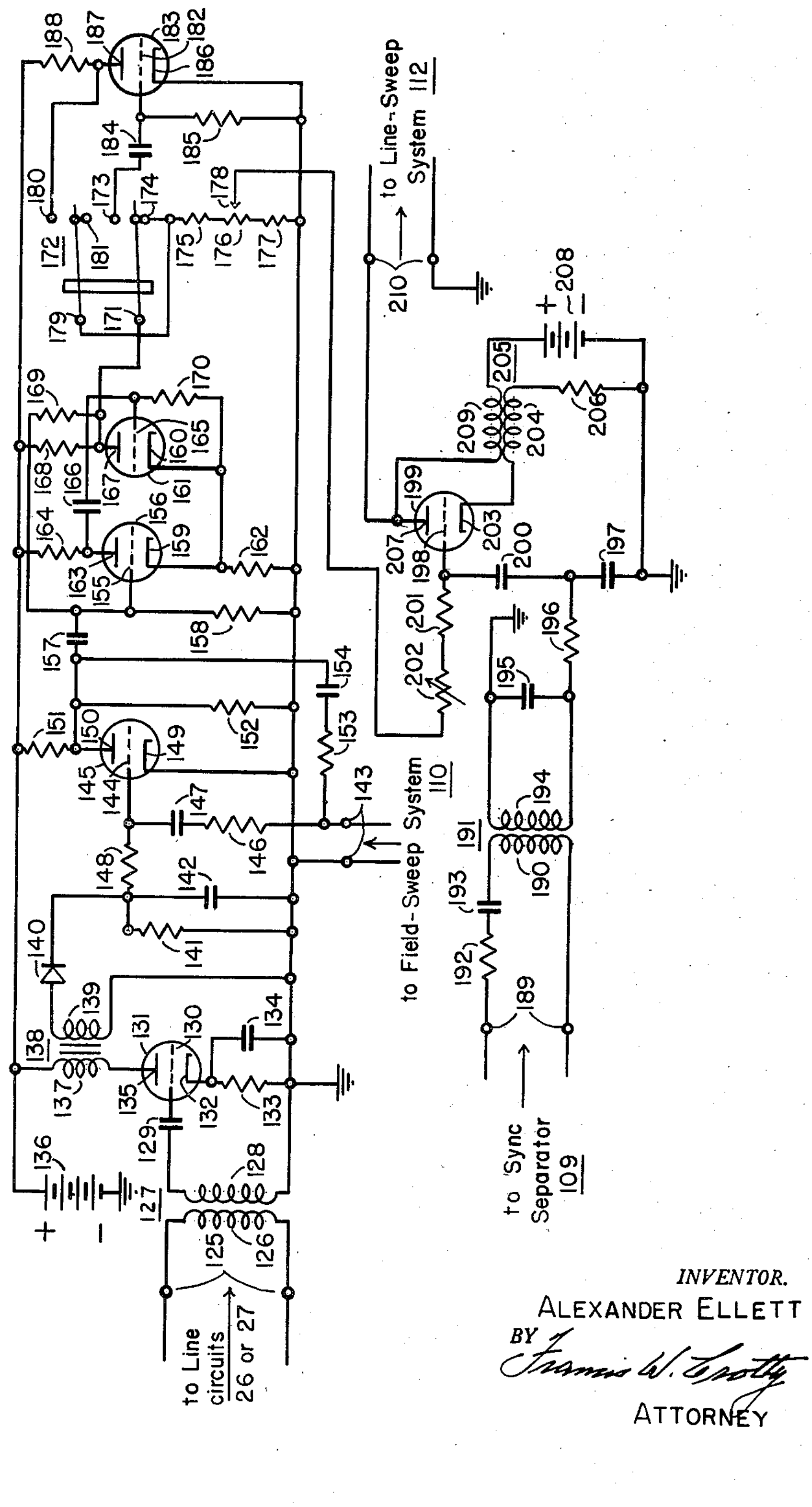

The features of this invention which are believed to be new are set forth with particularity in the appended claim. The invention itself, however, together with further objects and advantages thereof may best be understood by reference to the following description when taken in conjunction with the accompanying drawings, in which:

Figure 1 shows a subscription television transmitter constructed in accordance with the invention, Figures 2 and 3 are detailed representations of a pair of key-signal generators included in the transmitter of Figure 1, Figure 4 shows a receiver for utilizing the subscription signal from the transmitter of Figure 1, and, Figure 5 shows decoding apparatus for use in the receiver of Figure 4 which may be conveniently conditioned to utilize either one of the two previously-mentioned key signals to perform its decoding function.

The transmitter of Figure 1 includes a picture-converting device 10 which may be of the iconoscope, image orthicon or any other well-known type. The output terminals of device 10 are connected to a video amplifier 11 which, in turn, is connected to a mixer amplifier 12. Mixer amplifier 12 is connected through a direct-current 13 to a carrier-wave generator and modulator 14 having output terminals connected to an appropriate antenna circuit 15, 16. The transmitter further includes a master synchronizing-signal generator 17 for generating line- and field-synchronizing pulses and associated blanking pedestals. Generator 17 supplies field-synchronizing pulses to a field-sweep system 18 having output terminals connected to the field-deflection elements 18*a* of device 10. The generator also supplies line-synchronizing pulses to a line-sweep system 19 through a coding device 20, the output terminals of sweep system 18 being connected to the line-deflection elements 19*a* of device 10.

Generator 17 further supplies field-synchronizing pulses to a frequency divider 22 which is preferably of the random type disclosed and claimed in copending application Serial No. 32,457, filed June 11, 1948, and issued March 11, 1952, as Patent 2,588,413, in the name of E. M. Roschke, entitled "Random Frequency Divider," and assigned to the present assignee. The output terminals of frequency divider 22 are connected to a multivibrator 23 of the Eccles-Jordan type. That is, multivibrator 23 is of the type that is triggered from a first to a second operating condition and then returned to its first operating condition by successive pulses of like polarity applied to its input terminals. Multivibrator 23 is connected to a key-signal generator 24 and to a further key-signal generator 25 having output terminals connected, respectively, to line circuits 26, 27. The line circuits extend to the subscriber receivers and existing telephone networks may conveniently be used for this purpose. The key-signal generators 24 and 25 are to be described in detail hereinafter in conjunction with Figures 2 and 3. The output terminals of key-signal generator 24 are further connected to a control circuit 28 by leads 29, control circuit 28 having further input terminals connected to generator 17 to derive field-synchronizing pulses therefrom, and having output terminals connected to coding device 20.

Picture-converting device 10 generates a video signal representing an object scanned by the device, and this signal is amplified in video-amplifier 11 and applied to mixer amplifier 12. Synchronizing-signal generator 17 applies line-and-field-synchronizing pulses and associated blanking pedestals to the mixer amplifier, and a television signal is produced at the output terminals of this amplifier which includes video components and line-and-field-synchronizing components. The television signal is appropriately adjusted as to background level by inserter 13 and is applied to carrier-wave generator and modulator 14 wherein it is modulated on a suitable picture carrier and radiated by antenna circuit 15, 16.

Synchronizing-signal generator 17 also applies field-synchronizing pulses to field-sweep system 18 to synchronize the field scansion of device 10, and further supplies line-synchronizing pulses to line-sweep system 19 through coding device 20 to control the line scansion of this device. However, coding device 20, acting under the control of control circuit 28, advances the timing of the line-synchronizing pulses applied to line-sweep system 19 during certain spaced intervals selected in accordance with a coding schedule. This causes a corresponding advance in the timing of the video signal generated by device 10 relative to the line-synchronizing components applied to mixer 12. In this manner, the transmitter operates in a first mode during which the video components of the radiated television signal have a selected timing relative to the line-synchronizing components, and during selected spaced intervals it operates in a second mode wherein the video components have an advanced or altered time relation with respect to the line-synchronizing components. The radiated television signal is, therefore, effectively coded since the timing between its video components and line-synchronizing components is not invariable as is required for proper utilization by conventional television receivers not equipped with appropriate decoding apparatus; moreover, this timing varies in accordance with the afore-mentioned coding schedule.

The frequency-divided pulses produced by frequency divider 22 trigger multivibrator 23, causing it to generate positive-polarity pulses delivered to its output terminals during random spaced intervals corresponding to the random frequency division of the divider. These pulses have leading and trailing edges occurring during field-retrace intervals since the multivibrator is triggered by pulses each occurring in time-coincidence with a field-synchronizing pulse. Multivibrator 23 turns key-signal generator 24 on and turns key-signal generator 25 off for the duration of each of the aforementioned pulses appearing in its output terminals. In the absence of an output pulse from the multivibrator, generator 24 is inoperative while generator 25 is producing a key signal. In this manner, key-signal generator 24 generates a burst of key signal on line circuit 26 during spaced operating intervals, and key-signal generator 25 generates bursts of key signal on line circuit 27 during the intervals intermediate such spaced operating intervals. In other words, the key signal produced on line circuit 26 is modulated by bursts during spaced operating intervals, and the key signal produced on line circuit 27 is oppositely modulated by bursts during intermediate intervals. The bursts of key signal on line circuit 26 are applied to control circuit 28, which is so constructed that the field-synchronizing pulses immediately succeeding the initiation and termination of each key signal burst cause coding device 20 to be actuated from one condition to the other to impart periodically the aforementioned advance to the timing of the line-synchronizing pulses applied to line-sweep system 19. Therefore, the timing of the video components of the radiated television signal with respect to its line-synchronizing components is advanced during certain spaced operating intervals, and may be considered to have a normal or reference value during the other portions of the program. The times of occurrence of these spaced operating intervals are indicated to subscriber receivers by the presence of bursts of key signal on line circuit 26 or by the absence of key-signal bursts on line circuit 27.

As indicated, control circuit 28 actuates coding device 20 during field-retrace intervals immediately following the initiation and termination of each burst of key signal on line circuit 26. Accordingly, the system avoids distortion that might otherwise arise should the change in timing take place during trace intervals. Additionally, the bursts of key signal on line circuit 26 precede the actual timing changes by a selected time interval so that slight delays of the key-signal bursts in their transmission over the line circuits have no adverse effect on the proper operation of the system. The construction and operation of control circuit 28 and coding device 20 is described in great detail in the aforementioned Roschke patent, and since these units in themselves form no part of the present invention, further description thereof is deemed to be unnecessary.

It is preferred that generators 24 and 25 produce key signals of the same frequency, preferably, one which is outside the audible range so as not to interfere with the normal functioning of the telephone network when such is used to distribute the key signals. Since the generators operate in alternation and the key signals on line circuits 26, 27 may be considered to be modulated in opposite senses with the information representing the coding schedule, any signal that might be induced in circuits adjacent and coupled to line circuits 26, 27 is a continuous tone conveying no information with respect to the coding schedule of the radiated signal. For economy of operation, the subscriber receivers are so connected to the network that approximately half obtain the key signal from line circuit 26 and the remainder obtain it from line circuit 27.

Key-signal generator 24, shown in detail in Figure 2, includes a pair of input terminals 35 connected to multivibrator 23. One of these terminals is grounded and the other is connected to the control electrode 36 of an electron-discharge device 37 through a coupling capacitor 38, the control electrode being connected to the cathode 39 through a grid-leak resistor 40. Cathode 39 is connected to ground through a resistor 41, and the anode 42 is connected to the positive terminal of a source of unidirectional potential 43 through a resistor 44, the negative terminal of source 43 being connected to ground. Anode 42 is further connected to the control electrode 45 of an electron-discharge device 46 through a resistor 47, this electrode being connected to the negative terminal of a biasing source 48 through a resistor 49. The anode 50 of device 46 is directly connected to the positive terminal of source 43 and the cathode 51 is connected to ground through an inductane coil 52, the inductance coil being shunted by a capacitor 53 to form a frequency-determining network. Another electron-discharge device 54 has its control electrode 55 connected to cathode 51 of device 46, its anode 56 connected to the positive terminal of source 43, and its cathode 57 connected to a center tap on inductance coil 52. A further inductance coil 58 is inductively coupled to coil 52 and connected to line circuit 26.

Device 54 and frequency-determining circuit 52, 53 constitute a well-known form of oscillation generator which responds to the control effect of the output signal of multivibrator 23 applied to input terminals 35. When that signal permits the generator to function, it produces a key signal having a frequency determined largely by the resonant frequency of network 52, 53.

The multivibrator which is triggered from one operating condition to another by successive output pulses from frequency divider 22 may be considered as a generator developing a control signal of rectangular wave form having components of positive polarity alternating with components of negative polarity as determined by the output of the frequency divider. In the presence of the negative-polarity components, device 37 is non-conductive and the positive potential from source 43 applied to control electrode 45 of device 46 overcomes the negative biasing potential applied to this electrode by biasing source 48 rendering device 46 conductive. Conduction in device 46 provides a low-impedance path from anode 56 of device 54 to control electrode 55 of this device and suppresses oscillations. Hence no key signal is delivered to line circuit 26. In the presence of the positive-polarity components of the signal from multivibrator 23 device 37 is conductive, and the resulting voltage drop across resistor 44 decreases the positive potential applied to control electrode 45 from source 43. The negative bias applied to this electrode from source 48, then causes device 46 to become non-conductive. Whenever device 46 is non-conductive oscillations are generated and are applied to line circuit 26. Therefore, a burst of key signal occurs on line circuit 26 for the duration of each positive-polarity component of the output signal of multivibrator 23 applied to input terminals 35.

Key-signal generator 25, illustrated in detail in Figure 3, is similar in many respects to the generator of Figure 2. Primed numerals are used in Figure 3 to indicate elements thereof similar to those of the circuit of Figure 2. The generator of Figure 3 includes a pair of input terminals 75 connected to multivibrator 23. One of terminals 75 is grounded and the other is coupled to the control electrode 76 of an electron-discharge device 77 through a coupling capacitor 78, the control electrode being connected to ground through a resistor 79. The cathode 80 of device 77 is connected to ground and the anode 81 is connected to the positive terminal of source 43' through a load resistor 82.

The generator of Figure 3 operates in a manner similar to that of Figure 2, except that device 77 is a phase inverter so that oscillations are sustained in generator 52', 53', 54' during the negative-polarity components of the signal from multivibrator 23 applied to terminals 75. Frequency-determining circuit 52', 53' is tuned to the same frequency as network 52, 53 of Figure 2 so that the bursts of key signal delivered to line circuit 27 have the same frequency as the bursts on line circuit 26. It is evident that the two line circuits cooperate to induce a continuous tone in any circuits mutually coupled thereto and that this tone bears no indication of the coding schedule employed at the transmitter.

The receiver of Figure 4 includes a radio-frequency amplifier 100 having input terminals connected to an antenna circuit 101, 102 and output terminals connected to a first detector 103. The first detector 103 is coupled to an intermediate-frequency amplifier 104 which, in turn, is connected to a second detector 105. The output terminals of second detector 105 are coupled through a video amplifier 106 to the input electrodes 107 of a cathode-ray image-reproducing device 108. Second detector 105 is further coupled to a synchronizing-signal separator 109 having output terminals coupled to a field-sweep system 110 and through decoding apparatus 111 to a line-sweep system 112. The output terminals of sweep systems 110 and 112 are connected respectively to the field-deflection elements 113 and line-deflection elements 114 of reproducing device 108. Decoding apparatus 111 has further input terminals connected to field-sweep system 110 to derive field-blanking pulses therefrom, and still further input terminals connected to line circuit 26 or 27 extending to the transmitter of Figure 1. The decoding apparatus is to be described in detail hereinafter in conjunction with Figure 5 and may be conditioned to respond to either the bursts of key signal on line circuit 26 or the bursts on line circuit 27 to perform its decoding function.

The receiver may be tuned to utilize the signal transmitted by the transmitter of Figure 1, such signal being intercepted by antenna circuit 101, 102, amplified in radio-frequency amplifier 100, and heterodyned to the selected intermediate frequency of the receiver in first detector 103. The resulting intermediate-frequency signal is amplified in intermediate-frequency amplifier 104 and detected in second detector 105 to produce a composite video signal. The video signal is amplified in video amplifier 106 and applied to the input electrodes 107 to control the intensity of the cathode-ray beam in device 108 in well-known manner.

The synchronizing components of the detected signal are separated out in synchronizing-signal separator 109, the field-synchronizing components being applied to field-sweep system 110 and the line-synchronizing components being applied to line-sweep system 112 through decoding apparatus 111. Decoding apparatus 111 utilizes the key signal on one of the line circuits to alter the timing of the line-synchronizing components applied to line-sweep system 112 by the proper amount and in the proper sense to compensate for the previously-described variation in timing between the video components and line-synchronizing components of the received coded signal. The changes in timing of these components occur during the field-retrace intervals following the initiation and termination of each burst of key signal on line circuits 26 and 27 and the decoding apparatus responds jointly to the key signal from one of the lines and to the field-blanking pulses to effect the necessary timing change in the line-synchronizing pulses applied to line-sweep system 112 in time coincidence with similar timing changes at the transmitter.

One embodiment of decoding apparatus 111, shown in detail in Figure 5, comprises a pair of input terminals 125 connected to either line circuit 26 or line circuit 27, and further connected to a primary 126 of a transformer 127. The secondary winding 128 of transformer 127 is connected to ground and through a coupling capacitor 129 to the control electrode 130 of an electron-discharge device 131. The cathode 132 of device 131 is connected to ground through a resistor 133 shunted by a capacitor 134, and the anode 135 of this device is connected to the positive terminal of a source of unidirectional potential 136 through the primary winding 137 of a transformer 138. The secondary winding 139 of transformer 138 is connected to ground and through a rectifier 140 to a resistor 141. The other side of resistor 141 is connected to ground and this resistor is shunted by a capacitor 142.

The circuit includes a second pair of input terminals 143 connected to field-sweep system 110, one of these terminals being connected to ground and the other coupled to the control electrode 144 of an electron-discharge device 145 through a series-connected resistor 146 and capacitor 147. Control electrode 144 is connected to the junction of rectifier 140 and resistor 141 through a limiting resistor 148. The cathode 149 of device 145 is connected to ground, and the anode 150 of this device is connected to the positive terminal of source 136 through a resistor 151 and to ground through a resistor 152. The ungrounded terminal 143 is further coupled to the junction of resistors 151 and 152 through a series-connected resistor 153 and capacitor 154, this junction being coupled to the control electrode 155 of an electron-discharge device 156 through a coupling capacitor 157 and the control electrode being connected to ground through a resistor 158.

The cathode 159 of device 156 is directly connected to the cathode 160 of an electron-discharge device 161, and the cathodes are connected to ground through a resistor 162. The anode 163 of device 156 is connected to the positive terminal of source 136 through a resistor 164 and is coupled to the control electrode 165 of device 161 through a capacitor 166. The anode 167 of device 161 is connected to the positive terminal of source 136 through a resistor 168 and to control electrode 155 of device 156 through a resistor 169. Control electrode 165 of device 161 is connected to cathode 160 through a resistor 170.

The anode 167 of device 161 is connected to the movable arm 171 of a double-pole double-throw switch 172, this arm contacting with terminal 173 or 174. Terminal 174 is connected to ground through series-connected resistors 175, 176 and 177, resistor 176 having a movable tap 178 associated therewith. Terminals 174 is further connected to the movable arm 179 of switch 172, this latter arm contacting with terminal 180 or open terminal 181. Terminal 173 is coupled to the control electrode 182 of an electron-discharge device 183 through a coupling capacitor 184, the control electrode being connected to ground through a grid-leak resistor 185. The cathode 186 of device 183 is connected directly to ground and the anode 187 of this device is connected to the positive terminal of source 136 through a resistor 188.

The circuit has further input terminals 189 connected to the synchronizing-signal separator 109, these terminals being coupled to the primary winding 190 of a transformer 191 through a resistor 192 and capacitor 193. The secondary winding 194 of transformer 191 is shunted by a capacitor 195, one side of the secondary winding being connected directly to ground and the other being connected to ground through a resistor 196 and capacitor 197. The junction of resistor 196 and capacitor 197 is coupled to the control electrode 198 of an electron-discharge device 199 through a capacitor 200, the control electrode being connected to tap 178 through a resistor 201 and a variable resistor 202. The cathode 203 of device 199 is connected to ground through a winding 204 of a transformer 205 and through a resistor 206. The anode 207 of device 199 is connected to the positive terminal of a source of unidirectional potential 208 through a second winding 209 of transformer 205. Anode 207 is further connected to one of the output terminals 210, the other output terminal being grounded. Output terminals 210 are connected to the line-sweep system 112 of Figure 4.

Line-synchronizing pulses from synchronizing signal separator 109 are applied across terminals 189 and impressed on the primary winding 190 of transformer 191. The secondary winding 194 and capacitor 195 form a resonant circuit tuned to the frequency of the line-synchronizing pulses so that a sine wave synchronized with these pulses is developed in this circuit. The sine wave is phase-shifted slightly in network 196, 197 and applied to control electrode 198 of device 199. The device 199 is connected as a well-known blocking-oscillator circuit and produces pulses across output terminals 210 due to the triggering of the blocking oscillator by the sine wave applied to control electrode 198. The triggering point of the blocking oscillator may be adjusted by variation of resistor 202 in the grid-return circuit of device 199, and this resistor is adjusted to provide a selected timing between the pulses appearing across output terminals 210 and the line-synchronizing pulses applied across terminals 189.

The bursts of key signal from line circuits 26 or 27 are applied to the primary winding 126 of transformer 127 by way of terminals 125. These bursts are amplified by device 131 and rectified by rectifier 140 so that negative-polarity rectified bursts appear across resistor 141 in time coincidence with the bursts of key signal appearing on the line circuits.

Field-blanking pulses from the field-sweep system are applied to the control electrode of device 145 by way of terminals 143 and series-connected resistor 146 and capacitor 147. These pulses are of positive polarity and upon translation by the device 145 appear across resistor 152 with negative polarity. The field blanking pulses are also applied directly to resistor 152 by series-connected resistor 153 and capacitor 154 and appear with positive polarity across the former resistor. The circuit parameters are chosen so that when the negative-polarity rectified key-signal bursts appear across resistor 141, device 145 is rendered non-conductive and only the positive-polarity field blanking pulses from network 153, 154 appear across resistor 152. However, during the intervals between the rectified key-signal bursts, device 145 is conductive and amplified negative-polarity field-blanking pulses of double amplitude appear across resistor 152, which when combined with the positive-polarity field-blanking pulses from network 153, 154, produce negative-polarity resultant field-blanking pulses across resistor 152. In this manner, the polarity of the field-blanking pulses appearing across resistor 152 is reversed immediately after the initiation and termination of each burst of key signal across resistor 141.

The devices 156 and 161 are connected in well-known fashion to form a single-shot multivibrator. That is, a positive-polarity pulse applied to control electrode 155 triggers the multivibrator from a first condition wherein device 161 is predominantly conductive to a second condition wherein device 156 is predominantly conductive and the next succeeding negative-polarity pulse applied to this control electrode returns the multivibrator to its first condition. Assuming that switch 172 is in the illustrated position conditioning the dividing apparatus for connection to line circuit 26, the multivibrator develops a positive-polarity pulse across resistors 175–177 whenever it is in its second operating condition. As previously mentioned, the multivibrator is triggered between its operating conditions by the reversed-polarity field-blanking pulses occurring immediately after the initiation and termination of each rectified key-signal burst across resistor 141. Therefore, the positive-polarity pulses appearing across resistors 175–177 correspond to the key signal bursts of line circuit 26, but have leading and trailing edges occurring during the field-retrace intervals following the initiation and termination of such bursts, and thus in time coincidence with the aforementioned variations in the received subscription signal.

The pulses appearing across resistors 175–177 are applied to the control electrode 198 of the blocking-oscillator discharge device 199 through resistors 202 and 201, and pedestal the triggering sine wave applied to this control electrode from circuit 194, 195. When the sine wave is so pedestalled, the triggering of the blocking oscillator occurs at a different portion in each cycle thereof, and the timing of the pulses across output terminals 210 is altered relative to the timing of the line-synchronizing pulses applied to terminals 189. The amount of this timing alteration depends on the amplitude of the pulses applied to control electrode 198 which, in turn, can be adjusted by variation of tap 178.

As previously stated, bursts of key signal appearing on line circuit 26 indicate an advance in timing between the video and line-synchronizing components of the received television signal. To compensate for this, the timing of the line-synchronizing pulses applied to line-sweep system 112 of the receiver of Figure 4 must be advanced a corresponding amount. The pedestalling of the triggering sine wave applied to control electrode 198 of blocking oscillator 199 accomplishes an advance in the timing of the pulses across terminals 210. Tap 178 is adjusted so that the advance corresponds exactly to the timing advance of the video components of the television signal. Moreover, resistor 202 is varied to adjust the triggering point of the blocking oscillator so that during the intermediate intervals the output pulses across terminals 210 have a proper phase relation with respect to the line-synchronizing pulses applied to terminals 189 corresponding to the selected time relation between the video and line-synchronizing components of the television signal during such intervals.

To condition the decoding apparatus of Figure 5 for connection to line circuit 27, the movable arms of switch 172 are moved to their uppermost positions. This connects device 183 into the decoding apparatus as a phase inverter so that negative-polarity pulses appear across the resistors 175–177 during the intervals when the bursts of key signal appear on line circuit 27, these pulses being initiated and terminated during the field retrace intervals following the initiation and termination of each of these bursts as previously described.

The bursts of key signal on line circuit 27 represent the intervals when the timing of the video and synchronizing components of the television signal has a delayed value relative to that established between the key-signal intervals, and negative-polarity pulses appear across resistors 175–177 occur during the key-signal intervals. Resistor 202 is adjusted so that the triggering of the blocking oscillator by the triggering sine wave and the pulses appearing from time to time across resistors 175–177 produce at output terminals 210 driving pulses which time the operation of the line-sweep system as required to effect image reproduction in response to the received but coded television signal. The control of the blocking oscillator is generally the same as described for the condition in which the decoder is coupled to line circuit 26 and need not be developed further.

The decoding apparatus is capable, therefore, of responding to the bursts of key signal on line circuit 26 to advance the timing of the synchronizing pulses applied to the sweep system in correspondence with timing advances of the video components of the received signal. In addition, the decoding apparatus is capable of being conditioned to utilize the key signal on line circuit 27, and when so conditioned, delays the timing of the synchronizing pulses applied to the line sweep system of the receiver during the intervals of the bursts of key signal on this line circuit when the video components have a delayed timing with respect to the timing of these components during the intervals intermediate these bursts.

The invention provides, therefore, a subscription system in which the transmitter develops key-signal information that may be transmitted to various subscriber receivers over a telephone network, the key signal information having such characteristics that any possibility of its being induced into adjacent extraneous circuits is precluded.

The key-signal information manifests itself in two distinct key signals modulated in opposite senses so as to have opposing characteristics, each subscriber receiver being provided with decoding apparatus that may be simply conditioned to utilize either of the two key signals.

It is apparent that the invention is not limited to subscription systems in which coding is effected by a particular timing change of components of the coded signal, but embraces any system in which a signal is coded in accordance with a coding schedule and key-signal information representing the coding schedule is distributed to subscriber receivers over a line circuit or other signal channel.

While a particular embodiment of the invention has been shown and described, modifications may be made, and it is intended in the appended claim to cover all such modifications as fall within the true spirit and scope of the invention.

I claim:

A transmitter for a subscription-type television signalling system comprising: apparatus for producing a television signal; a coding device coupled to said apparatus for establishing said transmitter in a first operating mode during spaced operating intervals and in a second operating mode during intervening intervals in accordance with a coding schedule, effectively to code said television signal; key-signal generating apparatus for developing a first key signal having a predetermined characteristic during said spaced operating intervals and a predetermined different characteristic during said intervening intervals, and for concurrently developing asecond key signal having said predetermined characteristic during said intervening intervals and said predetermined different characteristic during said spaced operating intervals, whereby said first and second key signals are each indicative of said coding schedule; a plurality of separate but adjacent wire line circuits; and means including a pair of said wire line circuits for respectively distributing said key signals to subscriber receivers while precluding inductive coupling of said key signals into others of said wire line circuits.

References Cited in the file of this patent

UNITED STATES PATENTS

| | | |
|---|---|---|
| 2,436,516 | Larson et al. | Feb. 24, 1948 |
| 2,487,682 | Wendt | Nov. 8, 1949 |
| 2,510,046 | Ellett | May 30, 1950 |
| 2,513,176 | Homrighous | June 27, 1950 |
| 2,567,539 | Aram | Sept. 11, 1951 |
| 2,656,406 | Gray et al. | Oct. 20, 1953 |